United States Patent Office 2,867,083
Patented Jan. 6, 1959

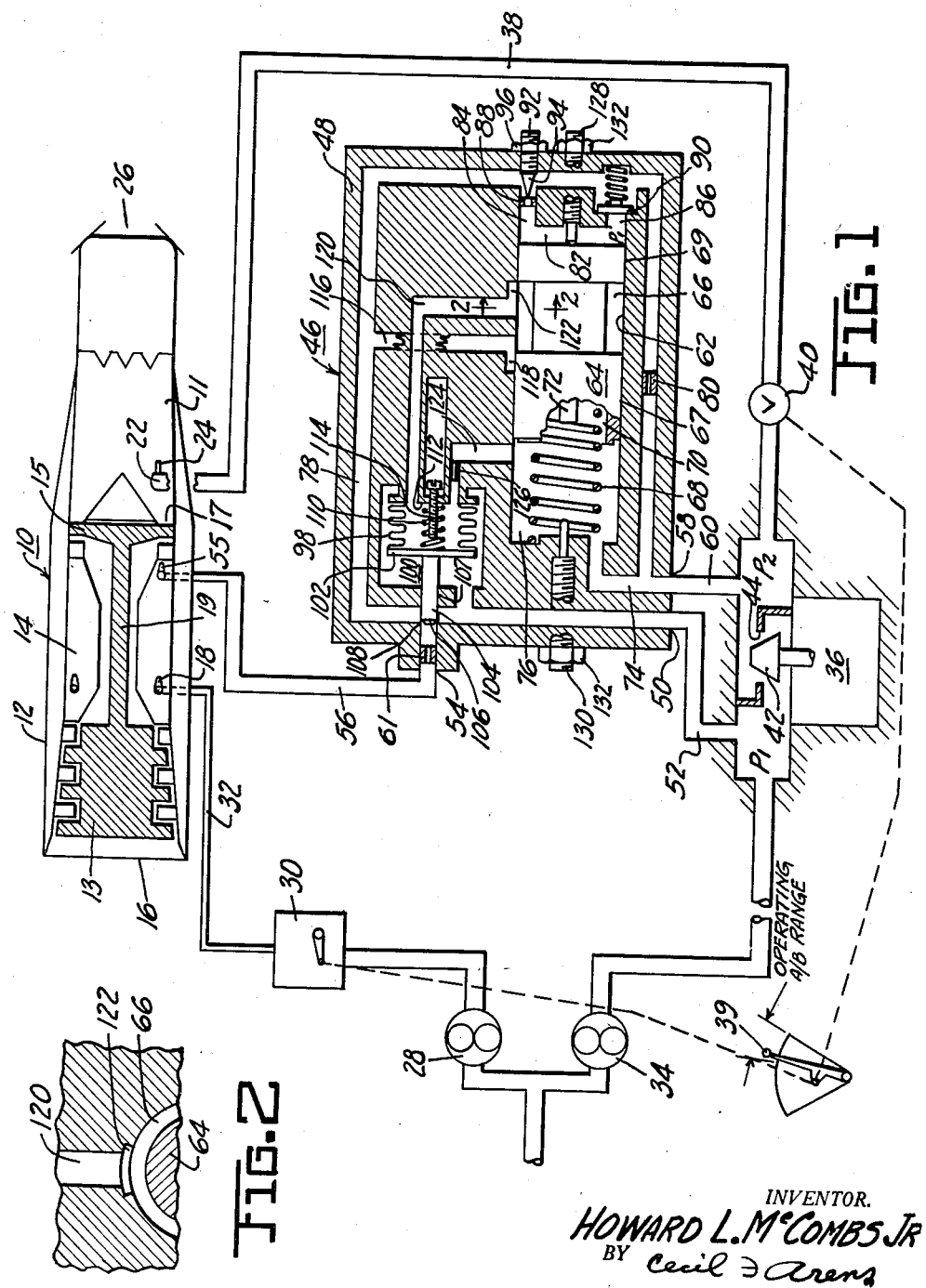

2,867,083

IGNITION CONTROL FOR TURBOJET AFTERBURNER

Howard L. McCombs, Jr., South Bend, Ind., assignor to Bendix Aviation Corporation, South Bend, Ind., a corporation of Delaware Application May 3, 1956, Serial No. 582,438

11 Claims. (Cl. 60—35.6)

This invention relates to an ignition device for gas turbine engines, and more particularly to such a device for an aircraft gas turbine engine which utilizes afterburner apparatus.

The conventional afterburner or thrust augmenting device as applied to aircraft gas turbine engines is adapted to produce an increase in available engine thrust under suitable conditions by the burning of additional fuel in the mixture of air and gases discharged from the turbine. Such an afterburner may utilize a fuel system such as that disclosed in copending application Serial No. 520,722 filed July 8, 1955, in the name of Howard J. Williams and having a common assignee. When the aircraft operator requests afterburner operation through the operation of suitable control equipment associated with the fuel system, it is desired to render the afterburner operative by means of an ignition system cooperative with the afterburner fuel system. Heretofore, afterburner ignition apparatus has utilized complicated electrical components which may require spark plugs, coils, and the like for operation or other accessories of a weighty nature. Furthermore, for efficient afterburner operation, it is desirous to have adequate fuel supplied to the afterburner manifold as quickly as possible in order to minimize the time lag between the operator request and afterburner operation. It is essential that the afterburner manifold receive sufficient fuel to insure fuel flow to the engine such that, in the presence of the turbine exhaust gases, combustion will readily occur.

It is an object of this invention to provide afterburner ignition means which require relatively few moving parts for the operation thereof and which is reliable in performance.

It is another object of this invention to provide an afterburner ignition system which requires a minimum number of connections to the engine fuel line.

Another object of this invention is to provide an afterburner ignition device and fuel flow timing mechanism which may be easily and efficiently adjusted to provide optimum fuel flow conditions for afterburner starting.

It is still another object of this invention to provide an afterburner igniting device which is compact and light in weight. An important object of this invention is to provide means for augmenting the normal supply of fuel to a gas turbine afterburner for a predetermined time subsequent to a demand for afterburner operation.

Another important object of this invention is to provide afterburner ignition means which, in the event of a malfunction of its parts, will fail safe such that excessive fuel flow to the engine is prevented.

Additional objects and advantages of the invention will become apparent from the following description with reference to the accompanying drawings wherein:

Figure 1 is a diagrammatic view of typical turbojet and afterburner apparatus, having operatively associated therewith ignition apparatus in accordance with the invention; and Figure 2 is a sectional view taken along line 2—2 of Figure 1.

As shown in Figure 1, the gas turbine power plant may comprise a turbojet engine 10 and afterburner apparatus 11, both of which are enclosed by a cylindrical casing adapted for mounting in a suitable location in an aircraft (not shown). The turbojet engine 10 includes the forward portion 12 of the cylindrical casing and within which is located an axial compressor 13, a series of combustion chambers 14 and a turbine 15 in series flow relation with a forwardly disposed air intake opening 16 and a rearwardly disposed turbine discharge passage 17. In operation, air entering the intake opening 16 is compressed by the compressor 13 and supplied to the combustion chamber section 14 where fuel injected through nozzles 18 is burned to form a gaseous motive fluid which expands through the turbine 15 and flows through passage 17 to the afterburner apparatus 11. The compressor 13 is drivably connected to the turbine 15 through a shaft 19.

The afterburner apparatus 11 comprises the rearward portion of the cylindrical casing. Mounted within this portion of the casing is an annular afterburner manifold 22 having a series of spaced fuel nozzles 24 mounted therein, only one of which is shown. The fuel nozzles 24 are exposed to the gases exhausted from the turbine 15 such that fuel flowing from the nozzles mixes with the gases and is burned to provide additional thrust upon discharge through the variable nozzle 26 to the atmosphere.

The main fuel pump 28 is connected to a supply tank, not shown, and supplies pressurized fuel to the main fuel control 30 which meters fuel according to engine requirements to the combustion chambers 14 through the fuel line 32. The main fuel control 30 may be of the type disclosed in copending application Serial No. 388,754 filed October 28, 1953, in the name of Elmer A. Haase et al. and having a common assignee.

Shown in Figure 1 is an engine driven fuel pump 34 which receives fuel from a source of supply, not shown, and supplies fuel at pressure $P_1$ to an afterburner fuel control 36 which meters fuel at presure $P_2$ to the nozzles 24 via afterburner manifold 22 through a fuel line 38. An operator-operated afterburner shut-off valve 40 is operably connected to an operator-operated throttle lever 39 and provides for starting and stopping the afterburner as desired. The afterburner fuel control 36 may comprise apparatus to effect an automatic regulation of the fuel flow to the afterburner. The afterburner throttling valve 42 controls the flow of fuel through the afterburner fuel control 36 according to the position of the throttle lever 39 by varying the area of orifice 44 through which fuel flows to the afterburner. A constant $P_1-P_2$ pressure drop is maintained across orifice 44 during afterburner operation by means of a conventional by-pass valve, not shown, incorporated in the afterburner fuel control 36 and which functions to divert excess fuel back to the fuel pump 34 inlet from the inlet side of orifice 44, as disclosed in the aforementioned application Serial No. 520,722.

According to the invention, an afterburner fuel ignition device 46 is shown comprising a casing 48 having a fuel inlet port 50 which communicates with the inlet of the afterburner fuel control 36 through a fuel line 52, an outlet port 54 which communicates with a fuel nozzle 55 in the combustion chamber 14 through a fuel line 56, and an outlet port 58 which communicates with the outlet of the afterburner fuel control through a fuel line 60. A restriction 61 is secured in the outlet port 54. A bore 62 slidably contains a piston 64 having an annular recess 66 and lands 67 and 69 formed thereon. A coil spring 68 is interposed between the end wall of bore 62 and piston 64 with one end extending into a recess 70 formed within piston 64. A circular rod 72 centrally located in recess 70 is secured to piston 64 and extends outwardly therefrom in axial alignment with coil spring 68. A fluid passage 74 communicates outlet port 58 with a variable volume chamber 76 adjacent the spring side of piston 64. Each of the ports, 50, 54, and 58, communicates with a passage 78 having a bleed 80 of relatively small area removably secured therein adjacent the downstream end. Fluid flow through passage 78 may be adjusted to suit requirements by selecting bleed 80 of proper area. A variable volume chamber 82 adjacent piston 64 and oppositely disposed to the spring side thereof is arranged to communicate with passage 78 upstream from bleed 80 through passages 84 and 86 which contain orifice 88 and spring loaded check valve 90, respectively. An adjustable screw member 92 having a tapered end portion 94 is threadedly engaged with casing 48 and with a lock nut 96. The tapered end portion 94 is axially aligned with orifice 88 and extends therein to provide a variable area restriction. The rate of response of piston 64 is proportional to the mass rate of fuel flow through restriction 88 and may be adjusted to suit requirements by varying the area of restriction 88 as required. A flexible bellows member 98 contained by a chamber 100 is securely attached at one end to casing 48 by any suitable means which will provide a positive airtight seal therebetween. A cover plate 102 is securely attached to the opposite end of bellows 98 such that the inner portion of the bellows is effectively sealed against fluid communication with chamber 100. A cylindrical valve member 104, one end of which is provided with a beveled end portion 106 and the other end of which is centrally located and securely attached to cover plate 102, is slidably supported in an aperture 107 in casing 48. The beveled end portion 106 is arranged to cooperate with a seat 108 in outlet port 54 to control the flow of fuel between passages 78 and 56. A spring 110 interposed between a shoulder 112 formed in casing 48 and cover plate 102 acts to expand bellows member 98 such that the beveled portion 106 of valve member 104 engages the seat 108 in outlet port 54. The valve member 104 is limited in its opening direction by an adjustable stop member 114 threadedly engaged with casing 48 and which extends axially through spring 110 to engage cover plate 102. Passage 78 communicates with the interior of bellows member 98 through a passage 116 having an enlarged end portion 118, annular recess 66 and a passage 120 having an enlarged end portion 122 at the bore end thereof. The interior of bellows member 98 further communicates with outlet port 58 through a passage 124 having a restriction 126 removably secured therein, variable volume chamber 76 and passage 74. The restriction 126 provides for the complete circulation of fuel through the device at the beginning of an operating cycle and allows a quantity of fuel to be by-passed around the afterburner throttling valve 42 at the beginning of the cycle. The fluid flow through passage 124 may be adjusted to suit requirements by selecting restriction 126 of proper area. The travel of piston 64 is selective and is limited in one direction by the engagement of circular rod member 72 with an adjustable screw member 128 and in the opposite direction by adjustable screw member 130, both of these members being coaxial with piston 64. Each of the screw members, 128 and 130, is threadedly engaged with casing 48 and may be locked in position by a lock nut 132 which frictionally engages casing 48.

*Operation*

It is to be assumed that the engine is operating within its speed range at a given throttle setting with the main fuel control 30 only in operation. The thrust energy developed by the engine under such conditions will exist as a result of fuel and air burning in the combustion chambers 14 with a subsequent expansion of the hot motive gases through the turbine 15, passage 17 and variable nozzle 26 to the atmosphere. The turbine 15 absorbs a portion of the total energy to drive the compressor 13 via shaft 19. The afterburner shut-off valve 40 is closed at this time, thus preventing fuel from flowing through the afterburner control 36. In the absence of a $P_1-P_2$ pressure drop across the afterburner throttle valve 42, the ignition device 46 will be inoperative such that all moving parts therein will assume a position as shown in the drawing. The fuel pressures in variable volume chambers 76 and 82 will be equal and spring 68 will displace piston 64 against adjustable screw member 130.

If the operator is confronted with a situation which requires afterburner operation, such as a need for maximum possible acceleration of the aircraft to top speed, the operator controlled throttle lever 39 may be advanced to a position which, through suitable linkage, causes the afterburner shut-off valve 40 to be opened. The afterburner throttling valve 42 will be positioned in orifice 44 as a function of the throttle lever position and a corresponding flow of fuel will be permitted through orifice 44. The $P_1-P_2$ pressure drop across orifice 44 will be controlled at a constant value by the aforementioned bypass valve, not shown. Fuel at pressure $P_1$ is caused to circulate through passage 52 and inlet port 50 to outlet port 58 through two flow paths which are in parallel with valve 42 and restriction 44. One of these paths is by way of passage 116, opening 118, annular recess 66, opening 122, and passage 120 to the interior of bellows member 98, thence through bleed 126 and passage 124 to variable volume chamber 76 from which it flows through passages 74 and 60 to outlet port 58. The other flow path is by way of passage 78 through bleed 80 and passage 74 to outlet port 58. The fuel then flows from outlet port 58 through passage 60 to conduit 38 where it is additive to the existing flow of fuel through restriction 44. The flow of fuel through the second of the above mentioned parallel paths is relatively small compared to that through the first. The primary purpose of the second path is to prevent the occurrence of hydraulic lock during a recycling of the system by allowing a small amount of fuel to flow continuously through the circuit. The above mentioned flow of fuel, being additive to that provided by restriction 44, effects a more rapid filling of the afterburner manifold 22 during the initial period of afterburner operation. The time required to pressurize the nozzles 24 and start fuel flow to the engine will thus be held to a minimum. Fuel flows through orifice 88 at a controlled rate into chamber 82 where the resulting $P_1'$ pressure causes piston 64 to be displaced against the combined forces of spring 68 and $P_2$ pressure acting against piston 64. As the piston 64 moves, land 67 interrupts communication between passage 124 and chamber 76 and land 69 interrupts communication between openings 118 and 122. As fuel ceases to flow through passage 120, a diminution in the fuel flow through outlet port 58 to conduit 38 occurs. The throttle valve 42 assumes normal control of the flow of fuel through conduit 38 to the afterburner with the exception of the small amount of flow through the circuit containing bleed 80. Passage 120 is vented to chamber 82 through opening 122, thus causing the pressure within bellows member 98 to drop from $P_1$ to $P_1'$. The subsequent $P_1-P_1'$ pressure differential occurring across cover plate 102 causes a contraction of bellows member 98 and a retraction of valve member 104 from valve seat 108 such that fuel is permitted to flow through passage 56 to nozzle 55, from which it is discharged into combustion chamber 14 and ignited by the hot gases therein. The resulting flame is carried through the turbine to the afterburner where it ignites the fuel supplied thereto through conduit 38. Piston 64 will continue to move under the influence of pressure $P_1'$ until rod 72 engages screw member 130. At this point, the pressure $P_1'$ in chamber 82, as well as in the interior of bellows 98, will begin to build up to pressure $P_1$. The $P_1-P_1'$ pressure differential across cover plate 102 becomes zero and the spring 110 acts to bias valve member 104 to a closed position, thereby shutting off the flow of fuel through passage 56. The quantity of fuel delivered to the main burner 14 through passage 56 depends upon the length of the stroke of piston 64. By means of suitable adjustment of screw member 130, the stop position of piston 64 may be varied to give the desired piston stroke. The piston 64 and valve member 104 will remain in their present positions as long as afterburner operation continues and a $P_1-P_2$ pressure drop exists across restriction 44.

To discontinue afterburner operation, the afterburner shut-off valve 40 is actuated to a closed position by means of the operator controlled throttle lever 39. Fuel ceases to flow through conduit 38 and pressures $P_1$ and $P_2$ become equalized. The spring 68 acts to displace piston 64 towards adjustable screw member 128. As the piston moves, the fuel in chamber 82 exits to passage 78 through orifice 88, as well as through check valve 90, which opens under the influence of the chamber 82 fluid pressure. The check valve 90 is provided to minimize the time required for piston 64 to return to its starting position. The spring 68 will urge piston 64 into engagement with the screw member 128, thereby restoring the piston to its starting position.

If, at any time, the piston 64 should stick, seize, or otherwise fail to operate, the valve member 104 will be caused to close, thereby preventing excessive fuel flow to the burner, the occurrence of which would result in damage to the engine. The piston 64 must be in motion to create the $P_1-P_1'$ pressure differential necessary to to cause opening of the valve member 104 and, if the motion is prevented by a malfunction of the system, the $P_1'$ pressure in the system will immediately increase to $P_1$ pressure. The fluid pressure differential across bellows member 98 will cease to exist and valve 104, under the influence of spring 110 will fail safe.

Since the bellows member 98 is subjected to a fluid pressure differential, a failure, such as a rupture or the like, of this member would render it inoperative. If such a failure should occur, the spring 110 would function to maintain the valve 104 in a closed position, thus precluding a possibility of excessive fuel flow to the burner 14.

Although only one embodiment of the present invention is shown and described herein, it will be apparent to those skilled in the art that various changes and arrangements may be made to suit requirements of a particular application without departing from the scope of the invention.

I claim:

1. In a fuel system for a gas turbine having combustion apparatus capable of delivering a heated motive fluid to the turbine and an afterburner for receiving the turbine exhaust, a fluid pump, means for controlling a flow of fluid from said pump to said combustion apparatus, means for controlling a flow of fluid from said pump to said afterburner, means for metering a predetermined quantity of fluid flow from said pump to said combustion apparatus, and means associated with said second named means for augmenting the flow of fluid from said second named means to said afterburner during certain periods of operation of said second named means, said last named means being responsive to a flow of fluid through said second named means to cause a predetermined amount of excess fluid to be introduced into said combustion apparatus, whereby said excess fluid is converted to a transient flame which passes through said turbine to said afterburner for igniting the fluid delivered thereto by said second named means and said last named means.

2. In a fuel system for a gas turbine engine having a compressor, a main burner and an afterburner, a means for metering fuel to the main burner according to normal engine operating fuel requirements; means for metering fuel to the afterburner comprising a fuel metering restriction and a valve for controlling said restriction; means for metering a predetermined quantity of fuel in excess of normal fuel requirements to said main burner, said last named means including a passage for communicating fuel to said main burner, a valve member for controlling the fuel flow through said passage, a control fluid pressure operated member operatively connected to said valve member for actuating said valve member, and timing means responsive to a fuel pressure differential across said restriction for controlling said control fluid pressure and thus the quantity of said excess fuel metered to said main burner, said predetermined quantity of excess fuel being ignited and carried through said turbine in a transient flame condition to ignite the fuel supplied to said afterburner by said second named means.

3. In a fuel system for a gas turbine engine as claimed in claim 2 wherein said timing means includes adjustable means for varying said predetermined quantity of fuel according to the characteristics of a given power plant.

4. In a fuel system for a gas turbine engine as claimed in claim 1 wherein said fourth named means includes adjustable means for varying the amount of augmentation of said flow of fluid from said second named means.

5. In a gas turbine power plant having a compressor, a main burner for burning fuel in the presence of air delivered by said compressor, a turbine responsive to motive fluid from said burner, and an afterburner downstream from said turbine for burning additional fuel in the presence of exhaust gases from said turbine, a source of fuel, first and second fuel pumps connected to said source of fuel, a first conduit for delivering pressurized fuel from said first fuel pump to said main burner, fuel metering means in said first conduit for controlling the fuel flow therethrough, a second conduit connected between said second fuel pump and said afterburner, means in said second conduit for controlling the fuel flow therethrough, said second named means including a restriction and a valve for controlling the restriction, a passage in said second conduit in parallel flow relationship with said restriction, a branch passage connecting said main burner with said passage, means for controlling the flow through said passage and said branch passage, said last named means being responsive to a fuel pressure differential across said restriction such that a predetermined quantity of fuel is allowed to flow through said passage to augment the fuel flow from said second named means and further providing for a predetermined quantity of fuel to flow through said branch passage to said main burner such that the predetermined quantity of fuel will be ignited and carried as an incandescent mass through the turbine to the afterburner to ignite the fuel being supplied thereto.

6. In a gas turbine power plant having a compressor; a main burner and an afterburner; means for metering fuel according to normal engine requirements to the main burner; means for metering fuel to the afterburner comprising a fuel metering restriction; valve means for controlling said restriction; means for metering fuel to said main burner in excess of normal engine requirements and for supplying fuel to said afterburner to augment the flow of metered fuel from said second named means and being operative for a predetermined interval of time; said last named means being responsive to a fuel pressure differential across said valve means whereupon a first fuel passage in parallel flow relationship with said valve means is opened for a portion of said predetermined time interval to supply said augmenting flow of fuel after which said first fuel passage is closed and a second fuel passage is opened to supply a flow of fuel to said main burner in excess of said normal engine requirements for the remaining portion of said predetermined time interval, said excess fuel being ignited and carried through said turbine in a transient flame condition to ignite the fuel supplied to said afterburner by said second named means and said first fuel passage.

7. In a gas turbine power plant having a compressor, a main burner for burning fuel in the presence of air delivered by said compressor, a turbine responsive to a motive fluid from said burner, and an afterburner downstream from said turbine for burning additional fuel in the presence of exhaust gases from said turbine, afterburner fuel metering means comprising a fuel pump, a fuel manifold, a first conduit for delivering pressurized fuel to said fuel manifold, valve means in the conduit for controlling the fluid flow therethrough, a second conduit for delivering pressurized fuel to said fuel manifold and having a parallel flow relationship with said valve means, a branch conduit connected between said second conduit and said main burner, valvular means in said branch conduit for controlling the fuel flow therethrough, pressure responsive means having a fluid connection with said valvular means, said pressure responsive means being responsive to the pressure differential across said valve means and being adapted to control the movement of said valvular means upon operation of said afterburner, said valvular means acting to introduce a predetermined excess quantity of fuel into said main burner where it is subsequently ignited and carried through said turbine to said afterburner to ignite the fuel supplied thereto by said second conduit.

8. In a gas turbine power plant having a compressor, a main burner for burning fuel in the presence of compressor supplied air, a turbine responsive to a heated motive fluid from said burner, and an afterburner for burning fuel in the presence of exhaust gases from said turbine, a first fuel metering means for delivering pressurized fuel to said main burner, a second fuel metering means for delivering pressurized fuel to said afterburner, and afterburner ignition means comprising a casing having an inlet connected upstream of said second fuel metering means, a first outlet connected to said main burner, and a second outlet connected to said afterburner downstream from said second fuel metering means, said first and second outlets having a fluid connection with said inlet, a valve for controlling the fuel flow through said first outlet, resilient means urging said valve to a closed position, a first pressure responsive member having an operable connection with said valve and being responsive to a fluid pressure differential, a second pressure responsive member for controlling said fluid pressure differential, and a spring member operably connected to said last named member for urging said member to a position whereby said pressure differential causes said valve to be displaced to a closed position.

9. A fuel system for use with a gas turbine power plant having a compressor, a main burner for burning fuel in the presence of air delivered by said compressor, a turbine responsive to motive fluid from said burner, and an afterburner downstream from said turbine for burning additional fuel in the presence of exhaust gases from said turbine, a first fuel metering means for delivering pressurized fuel to said main burner, a second fuel metering means for delivering fuel to said afterburner, and afterburner ignition means including a casing having an inlet connected upstream from said second fuel metering means, a first outlet connected to said main burner, a valve member disposed in said first outlet for controlling the fuel flow therethrough, a second outlet connected to said afterburner downstream from said second fuel metering means, a passage connecting said inlet with said first and second outlets, a branch passage connecting said passage with said second outlet, said casing having a bore, said bore being divided into first and second variable volume chambers by a piston slidably contained therein, said first variable volume chamber being in series flow relationship with said branch passage, first and second passages connecting said second variable volume chamber with said passage, a variable area restriction disposed in said first passage, a one-way check valve disposed in said second passage and being arranged to open in response to a fluid pressure in said second variable volume chamber, a first adjustable stop member disposed in said first variable volume chamber, a second adjustable stop member in said second variable volume chamber, said first and second adjustable stop members being adapted to engage said piston to establish stopping and starting positions, respectively, thereof, a pressure responsive member operably connected to said valve member and being responsive to a fluid pressure differential, said fluid pressure differential being controlled by said piston in response to a differential in fluid pressures between said first and second variable volume chambers to cause actuation of said valve member to an open position whereby a predetermined quantity of fuel is permitted to flow to said main burner, said predetermined quantity of fuel being ignited in said main burner and carried through said turbine to said afterburner to ignite the fuel therein.

10. A fuel system as claimed in claim 9 wherein said second adjustable stop member may be adjusted to provide for different time intervals between an initial movement of said piston and a subsequent opening of said valve.

11. A fuel system as claimed in claim 9 wherein said first adjustable stop member may be adjusted to provide for variations in said predetermined quantity of fuel.

References Cited in the file of this patent

UNITED STATES PATENTS

| | | |
|---|---|---|
| 2,640,316 | Neal | June 2, 1953 |
| 2,780,055 | Bristol | Feb. 5, 1957 |

FOREIGN PATENTS

| | | |
|---|---|---|
| 686,425 | Great Britain | Jan. 21, 1953 |